United States Patent

[11] 3,609,724

[72] Inventors Gary L. Allison;
Laurence R. Beach; Friedrich R. Hertrich,
all of Boulder, Colo.

[21] Appl. No. 883,520
[22] Filed Dec. 9, 1969
[45] Patented Sept. 28, 1971

[73] Assignee International Business Machines
Corporation
Armonk, N.Y.

[54] RANDOM ACCESS STRIP RECORDING STATION
9 Claims, 3 Drawing Figs.

[52] U.S. Cl. .......... 340/174.1 R,
179/100.2 PM, 226/95, 226/108, 271/74
[51] Int. Cl. .......... G11b 5/02,
G11b 15/38, G11b 15/64
[50] Field of Search .......... 179/100.2
PM, 100.2 P; 340/174.1 C, 174.1 E, 174.1 F,
174.1 R; 226/95, 108; 341/22, 138; 274/4 J;
271/3, 74

[56] References Cited

UNITED STATES PATENTS 3,465,320 9/1969 Weidenhammer et al.... 340/174.1 E

*Primary Examiner*—Bernard Konick
*Assistant Examiner*—Steven B. Pokotilow
*Attorneys*—Hanifin and Jancin and Maurice H. Klitzman

ABSTRACT: A strip recording station having two vacuum rings axially spaced apart to grasp a strip record by its edges and cause the strip to conform to a cylindrical shape surrounding a positionable read/write head. The strip is revolved past the read/write head by rotating the vacuum rings about their axis, as many times as necessary and ejected upon completion of the read/write function.

INVENTORS
GARY L. ALLISON
LAURENCE R. BEACH
FRIEDRICH R. HERTRICH
BY Maurice H. Klitzman
ATTORNEY

RANDOM ACCESS STRIP RECORDING STATION

FIELD OF THE INVENTION

This invention relates to random access storage systems and more particularly to an improved read/write station in such systems. The invention disclosed and claimed in this application may be used in the environment of a random access strip storage system such as disclosed in an application by Clement H. Kalthoff et al., Ser. No. 734,807, filed June 5, 1968, now U.S. Pat. No. 3,504,824 and assigned to the same assignee as this application. The disclosure of the above application is incorporated into and becomes a part of this application.

For some years data processing equipment has made extensive use of storage systems in which information is represented in the form of magnetic patterns on a magnetizeable record medium. The information is recorded upon and read from the medium by magnetic transducers past which the medium is moved at a predetermined velocity.

Conventional magnetic tape, disk and drum systems are some of the more common examples. Tapes are generally considered as sequential storage devices in that particular information bits or groups stored thereon are generally addressable only in the sequence in which they are stored. Magnetic disks and drums have random access capabilities in that the surface portions upon which particular information is stored can generally be directly addressed. Both general forms of storage have particular attributes that make them attractive for certain applications. Tapes offer substantial storage volume in a minimum of physical space, while disks and drums provide more rapid and direct access to the information they store.

More recently there has been developed magnetic storage systems which provide combinations of the attractive features of both the high storage capacity minimum physical volume tape and the directly accessible disk or drum. Such systems employ record media in the form of plural strips of magnetizeable material that are stored for random access and that can be handled for reading and writing in the general manner of a disk or drum. In one common type of magnetic strip system, a selected strip is accessed by moving the entire system, a selected strip is accessed by moving the entire strip storage unit or a portion thereof so that the section containing the desired strip is brought to a selection station. At the station, the desired strip is identified, removed from the stored position and accessed to another station for processing. Upon completion of the processing, the strip is returned to its storage location and the procedure is repeated for the next desired strip.

In another common type of magnetic strip system, a desired strip is removed from the strip storage unit and individually transported to the processing station. Upon completion of the processing, the strip is returned to its storage location via a path which may be the same as, or different from the one over which it was accessed. Examples of the latter type of system are found in U.S. Pat. No. 3,176,279 issued to Lin et al., and assigned to the same assignee as this application.

While random access strip processing devices provide a number of distinct advantages over other types of processing systems as noted above, such devices typically suffer from certain shortcomings which complicate the application of their attractive features. One basic problem in the use of any strip processing station is that the record media is flexible and somewhat difficult to control.

Attempts in the past have been made to overcome this problem. One prior art device physically attaches the strip to a rotating drum inside a cylindrical housing. In this device the leading edge of the strip is attached to the drum and the remainder of the strip trails the leading edge. As the drum rotates the strip is moved outwardly by centrifugal force and relies on a housing to retain its radial position with respect to the drum. In this way the strip may be passed over a read/write head bar with some control and repeatability.

A significant disadvantage of this system just described is that as the strip is rotated with the drum, the centrifugal force forces the strip against the housing and since the recording surface must be adjacent to a read/write head positioned adjacent to the drum surface and therefore outside the drum, the recording surface is likewise facing outward and is abraded and rubbed by the interior of the cylindrical housing and any foreign material such as dust within the housing. This abrasive effect causes damage to the recording surface. Even if the recording surface is not severely damaged, the wear rate in local areas on the recording surface is substantially increased requiring much more frequent replacement of the recording media and a greater chance of losing recorded data due to the wearing of the recording surface.

In another prior art device this same problem of flexible record media was addressed by using a revolving drum which carried a strip recording on its exterior periphery and constraining the strip's tendency to move away from the drum's surface by mounting a series of pinch rollers and friction belts around the drum. These pinch rollers and friction belts eliminated the need to attach one edge of the recording strip to the drum surface but still there was the problem of excessive wear and damage to the recording surface by the contact between it and the friction belts and pinch rollers.

The strip orientation was dependent upon the pinch roll and friction belt action. They act to align and position the strip. This alignment and positioning function increased the frictional forces on the recording surface and therefore contributed to additional damage of the recording surface.

Also in prior art devices such as the first described above when the leading edge of the strip is restrained and the remainder of the strip allowed to generally conform to the drum surface. The centrifugal force acting on the strip will have a tendency to move the strip away from the drum surface. Since the strip is not always at an equal distance from the drum surface any magnetic transducer or read/write head placed at a fixed distance from the drum surface will experience a varying head gap between the transducer and the recording surface. This leads to erratic reading and writing of data on the recorded surface. Also if the record strip is not constrained at its trailing edge it will have a tendency to make physical contact with the read/write head and thereby abrade the recording surface or the head surface.

It is therefore a primary object of this invention to reduce the damage to record media caused by strip recording read/write stations.

It is another object of this invention to minimize the variations in the head-record gap between the transducing head and the recording surface.

It is still another object of this invention to eliminate the need for mechanical restraining devices that constrain a strip during its passage through a read/write station.

It is a further object of this invention to eliminate the requirement of mechanically attaching any portion of the recorded strip to a revolving surface or drum.

Additional objects will become apparent to one skilled in the art from the description and operation described below.

SUMMARY OF THE INVENTION

The objects of the invention are accomplished by forming the record strip into a partial cylinder with the recording surface as the interior of the cylinder and grasping and holding cylinder so formed by its ends by vacuum rings. The cylinder is then rotated about its axis in response to the rotation of the vacuum rings.

This protects the recording surface, reduces head to tail gap variances and eliminates the need for mechanical restraints tending to damage the record strip.

This is accomplished by the use of two rotating vacuum rings which rotate within a housing. These vacuum rings are coaxially spaced apart and rotated in synchronization. The edges of a strip are attracted to the rings leaving the central portion of the strip unencumbered. As the strip enters the station it is caused to conform to the cylindrical surface described by the synchronous rotating rings and thereby forms a cylinder. The strip is fed into the station with its recording surface on the interior of the cylinder thus formed. As the rings rotate the strip is carried with them and revolved past a read/write transducing head. Since there is no contact between the recording surface and the structure of the station there is no frictional contact to damage the recording surface.

Since there is no need for a solid surface such as a drum, there is adequate room inside the above-produced cylinder to mount a transducing head adjacent the recording surface.

When the reading or writing cycle has been completed, the vacuum is released and the centrifugal force and momentum of the rotating strip is utilized to eject it from the station housing. The recording surface is not subjected to frictional wear by any components of the read/write station other than the read/write head bar. The spacing at the head bar may be controlled by the application of vacuum head technology wherein the vacuum is also applied through the head attracting the recording surface into contact with the recording head.

DESCRIPTION OF THE INVENTION

Details & Description

Figure 1:
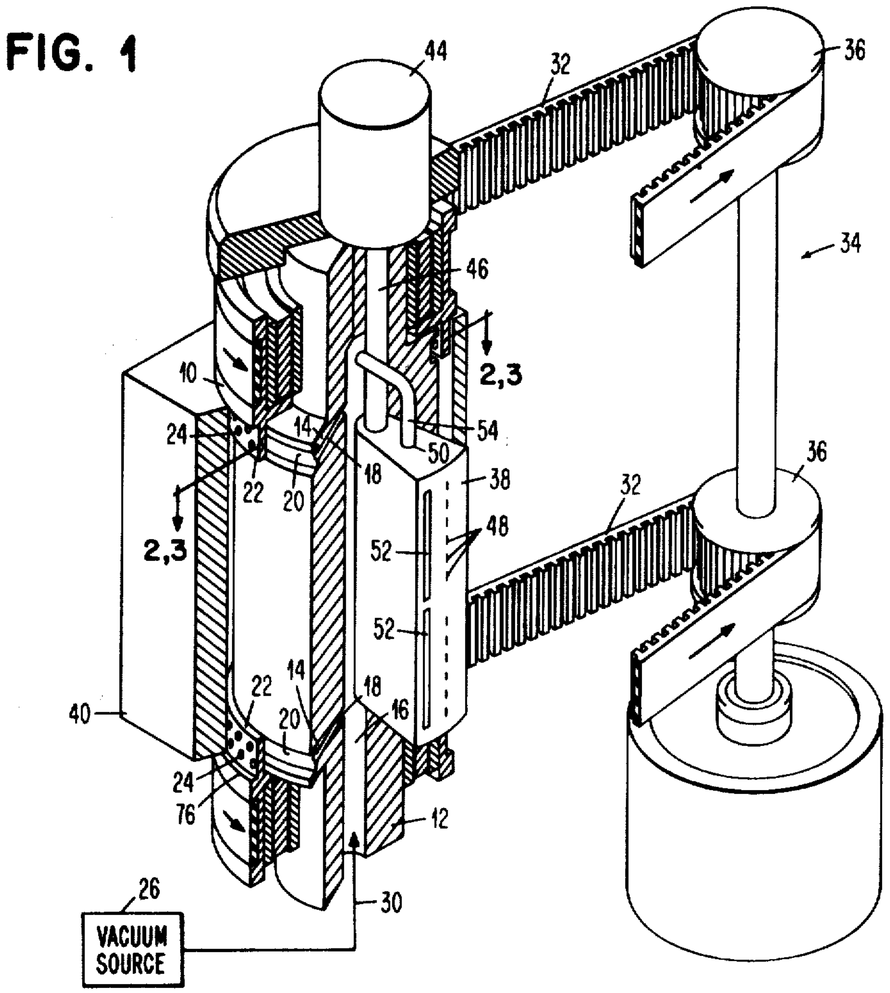
FIG. 1 is a perspective view partly broken away of the read/write strip processing station with drive means shown schematically.
Figure 2:
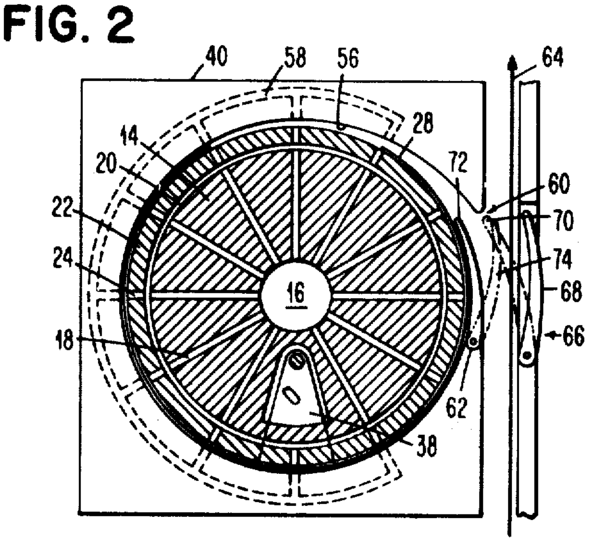
FIG. 2 is a sectional plan view of the arrangement of FIG. 1 together with an entrance-exit gate and a portion of a continuous transport.

FIGS. 1 and 2 illustrate the details of the invention. To maintain the rotating vacuum rings 10 in spaced relation a support 12 is provided. Support 12 extends axially throughout the structure of the processing station. Mounted on opposite ends of the support 12 are vacuum blocks 14. Support 12 provides a channel 16 to the vacuum blocks 14 through which the vacuum is transmitted. In each vacuum block 14 there are a plurality of conduits 18 extending from the main channel 16 in support 12 to the periphery of the block 14. These conduits 18 terminate in a plenum 20 formed into the periphery of the vacuum block 14. Concentrically mounted around the vacuum block 14 are two vacuum drive rings 10. To provide the support and the vacuum connections for these drive rings 10, vacuum blocks 14 are provided. When concentrically mounted on the vacuum blocks 14 the drive rings 10 have a circumferential band 22 into which are formed orifices 24. These orifices 24 are spaced around the entire circumference of this band of the drive ring 10. The vacuum orifices 24 also communicate with the plenum 20 into which vacuum conduits 18 connect. This plenum 20 provides sufficient communication between conduits 18 and orifices 24 so that even though vacuum blocks 14 and vacuum conduits 18 do not rotate and the drive rings 10 and orifices 24 do rotate, there is sufficient communication between the vacuum source 26 and vacuum channel 16, vacuum conduits 18, orifices 24 that a reduction of pressure at the orifices 24 occurs and will attract, grasp and hold a record strip 28 when in proximity of the orifices 24.

The vacuum blocks 14 are connected to a vacuum or pressure reducing source 26 through a conduit 16 in the support 12. Connected to this conduit 16 is a vacuum line 30 to the vacuum pump 26 schematically illustrated.

In one embodiment drive rings 10 are driven by cleated belts 32 of the type commonly known as timing belts. In FIG. 1 the drive means is illustrated schematically as 34. This drive means 34 is an electric motor or other suitable power source driving a notched timing pulley 36 for each drive ring 10. The cleated belt 32 connects the pulley 36 and the drive ring 10 and causes the ring 10 to rotate in response to the pulley 36 rotation.

An alternative to the cleated timing belt 32 and pulley 36 would be a chain and sprocket arrangement also providing a positive synchronous drive. As recognized by one skilled in the art other drive means may be substituted as long as the two drive rings 10 rotate in the same direction and at the same velocity.

Supported within the housing 40 and on support 12 is head bar 38. The transducer or magnetic head bar 38 is capable of being moved in a direction parallel to the axis of the station housing 40 and drive rings 10. This head bar 38 movement would be parallel to the surface of a cylinder formed by the record strip 28 when it conforms to the curvature of the vacuum drive rings 10. The movement of the head bar 38 is controlled by a voice coil actuator 44 through a connecting shaft 46. This allows the head 38 to be shifted so that the head segments 48 may align with desired tracks of data recorded on record strips 28 being processed. The head bar is provided with a vacuum channel 50 and ports 52 are provided in the record surface of the head bar 38 that connect to the vacuum channel 50.

A vacuum connection 54 is provided from a vacuum source 26 to the vacuum ports 52 of the head bar 38. Thus, vacuum may be applied to the record strip 28 to further control and refine the head-record gap over the entire length of the head bar 38.

As illustrated in FIG. 2 housing 40 has formed into its interior cylindrical surface 56 channels 58 which are supplied with pressurized air from a compressed air source (not shown). These channels 58 are spaced axially throughout the entire axial distance of the housing 40. The compressed air impinges upon the nonrecord side or back side of the record strip 28.

Mounted on the housing 40 at the entrance/exit slot 60 is the exit gate 62.

Adjacent to, but spaced slightly apart from, the side of the station housing 40 is a continuous transport 64. Positioned approximately in line with the transport 64 is the entrance gate 66.

The above-mentioned gates 62 and 66 may be collectively referred to as gating means. The gating means may be an integral apparatus or a plurality of gates.

DESCRIPTION OF THE OPERATION

Referring to FIG. 2 the entrance gate is normally positioned as indicated at 68 and the exit gate is normally at 72. As a recording strip 28 is moved by transport 64 into position, the entrance gate 66 assumes the position shown by dotted lines at 70 under the influence of a control. This deflects the record strip 28 from its straight course and guides it toward the interior of housing 40. Any contact between the record strip and the entrance gate 66 and housing 40 is made on the nonrecord side of the strip 28. As record strip 28 enters the main chamber of housing 40 its edges are attracted by the vacuum orifices 24 of the drive rings 10 best seen in FIG. 1. The drive rings 10 are driven in a synchronized manner at a speed which will coincide with the speed of the record strip 28 as it enters the processing station. The edges of the strip 28 reside against the annular surfaces 76 on the vacuum drive rings 10. This serves to align the record strip 28 as it enters the station and is transported and formed into a cylinder by the drive rings 10. As the record strip 28 continues to rotate in conjunction with the drive rings 10 the record strip 28 conforms itself into a cylindrical shape.

Since centrifugal force is acting on the midsection of the strip and the vacuum is acting only upon the edges of the strip, there is an inherent tendency for the midportion of the strip 28 to bulge outwardly and away from the head bar 38. This is counteracted by the introduction of pressurized air into channel 58. This positive air pressure tends to collapse the cylinder formed by strip 28 and thereby force the record media inward toward the axis of rotation.

A vacuum is applied to head bar 38 and also tends to attract the record strip 28. The net result of the positive pressure acting through channel 58, further referred to as fluid impinging means, and the vacuum acting through the vacuum parts 52 in head bar 38 is the control of the head-to-strip distance thereby giving uniform recording and read back. The strip 28 will continue to rotate with the vacuum drive rings 10 as long as vacuum is applied to the vacuum drive rings 10.

When the strip 28 is no longer needed in the processing station for additional processing, the exit gate 62 is moved to its alternate position indicated at 74 and the vacuum in the vacuum drive rings 10 is vented to atmospheric pressure. The centrifugal force generated by the rotation of the strip 28 tends to carry the strip 28 away from the drive rings 10 and project it outwardly through the entrance/exit slot 60. Transport 64 then returns this processed strip 28 to storage and when strip 28 has passed the entrance/exit slot 60, the exit gate 62 returns to its normal position 72. At this point in the sequence, the record strip read/write processing station is then prepared to accept and process another record strip.

Should atmospheric conditions such as humidity and temperature change the dimensions of record strip 28 the head bar 38 may be moved in a direction parallel to the central axis of the processing station. This is accomplished by a voice coil actuator 44 shown in FIG. 1. The connection between voice coil actuator 44 and head bar 38 is a connecting shaft 46. Appropriate control circuitry not shown moves the head 38 so that head segments 48 will correspond to their associated data tracks on the record strip 28.

Figure 3:
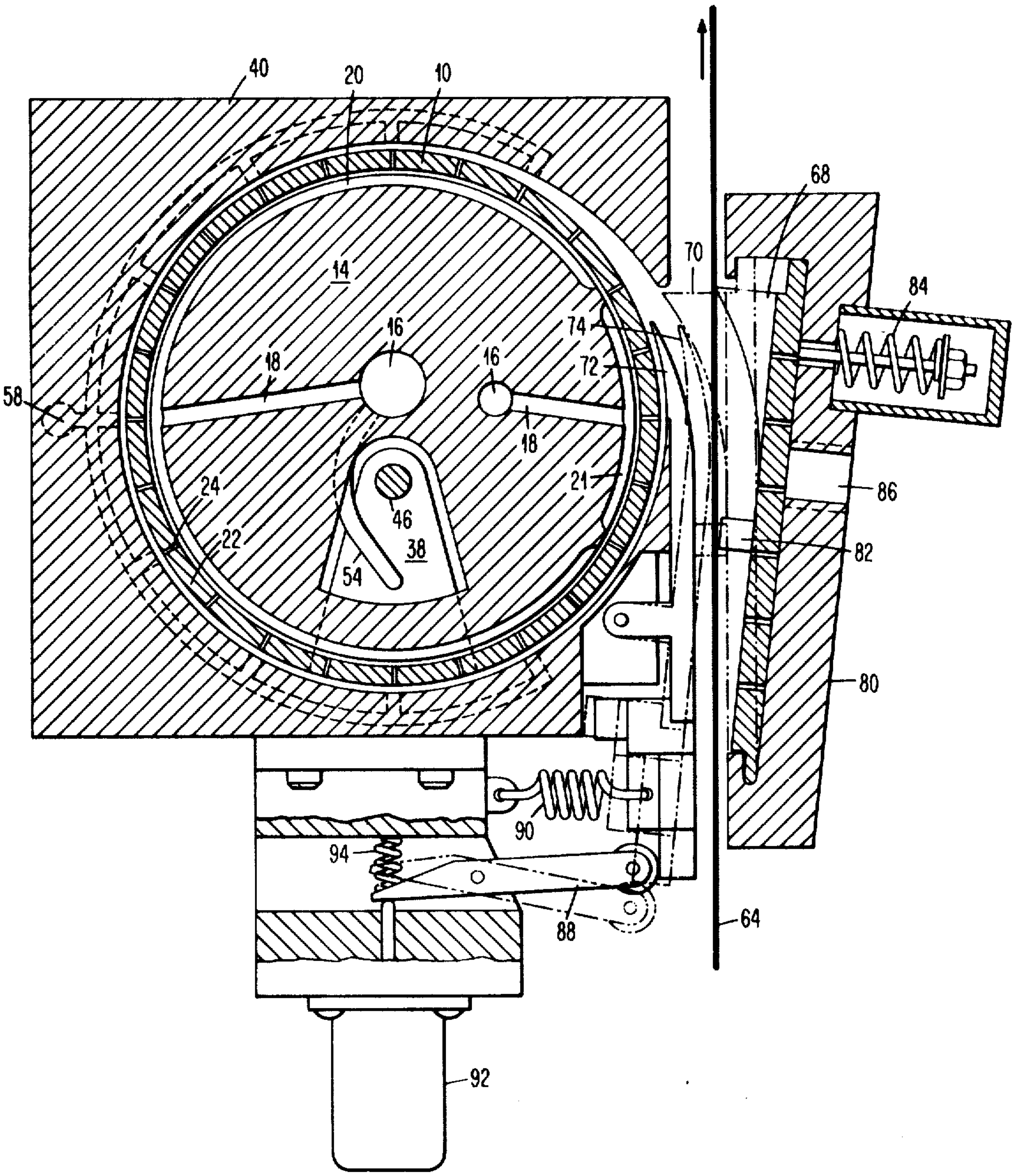
FIG. 3 is a sectional view showing an alternative embodiment of the vacuum blocks and entrance-exit gates.

A second embodiment of the invention is disclosed in FIG. 3, where vacuum block 14 has formed into its periphery two vacuum plenums, 20 and 21, which are selectively valved. The purpose of this selective valving of two separate plenums is an alternative method of removing the strip from the processing station. Under some circumstances, if there is only one vacuum plenum, or if both plenums are vented, the strip may lose some of its driving force and must rely only upon rotational momentum for its removal from the station. If a positive control of the strip is desired during the exiting from the station, gate plenum 21 is vented to allow the leading edge to move away from the drive ring in a progressive fashion. Thus the trailing portion of the strip continues to be grasped by the vacuum in vacuum plenum 20 and is progressively released as the strip passes the termination point of vacuum plenum 20 and encounters a vented gate plenum 21.

Vacuum plenum 21 will be hereafter referred to as the gate plenum, as it is positioned adjacent to the entrance-exit gate. Each plenum has a separate vacuum channel, 16, and vacuum conduit, 18. The vacuum in each plenum is controlled by a valving mechanism, which may selectively valve to atmospheric pressure, either or both plenums.

Also shown in FIG. 3 is a second embodiment of the arrangement and control of the entrance-exit gates or gating means. The elements of the gating means are numerically designated to correspond to the earlier discussed gating arrangement. A latch member 88 is provided to block the exit gate in its normally operative position, designated 72, and the latch member is selectively moveable by actuator 92 to dislodge latch member 88 and allow spring 90 to pull the exit gate 72 into its displaced position 74.

Entrance gate 68 may be pneumatically activated by air admitted into the entrance gate housing 80 through air inlet port 86 to effectively force entrance gate 68 to its displaced position 72. This action compresses spring 84 and when air is vented to atmospheric pressure again or is not continually fed under pressure to port 86, the spring retracts entrance gate 68 to its normal position.

The vacuum plenums 20 and 21 are selectively valved and vented to further facilitate insertion and removal of a magnetic recording strip from the processing station. As a strip enters the processing station, vacuum is applied to both plenums 20 and 21 and the strip is attracted to the drive ring 10 as earlier explained, with reference to the earlier embodiment. The drive ring rotates the strip in the station until a control apparatus allows gate plenum 21 to vent to atmospheric pressure. This allows the centrifugal force to move the leading edge of the recording strip away from the drive ring 10, and if latch 88 has been activated by actuator 92, the exit gate 72 is displaced to its alternate position 74, thereby allowing the leading edge of the recording strip to return to transport carrier 64 and hence be returned to storage.

In order to reset exit gate 72 to its normal position, a kicker 82 is provided on entrance gate 68. When air pressure is forced into exit gate housing 80 through air inlet port 86 to force the entrance gate 68 to move to its alternate position 70, the kicker 82 encounters the exit gate 72 if the exit gate is in its unlatched position 74. The kicker 82 then forces the exit gate 72 towards the processing station and extends spring 90. At this time latch spring 94 resets latch member 88 and the next recording strip to be transported past the processing station will be inserted into the processing station and processed as earlier described.

As can be seen by one skilled in the art, the objects of the invention have been accomplished by the inserting of a record strip into a chamber where the edges are grasped by two synchronized rotating rings and caused to conform to a cylindrical shape. This cylindrical shape is then rotated repeatedly past a magnetic head which is located internally of the cylinder described by the rotation of the strip. This serves to protect the recording surface of the strip and at the same time to eliminate a varying head-to-strip gap as the gap moves from the leading to the following edge of the strip. The problem of a varying head-to-strip gap is overcome by the cooperation of pressurized air impinging on the back of the record strip and vacuum applied through the magnetic head to the front or record surface of the strip.

While the invention has been particularly shown and described with reference to a preferred embodiment thereof, it will be understood by those skilled in the art that the various changes in form and details may be made therein without departing from the spirit and scope of the invention.

What is claimed is:

1. A strip record read/write processing station comprising:
   - a plurality of revolvable vacuum rings coaxially spaced apart;
   - support means internal to said vacuum rings and extending therebetween for rotatably supporting said rings with respect to said support means, said support means being stationary with respect to said rings;
   - transducer means positioned between said axially spaced rings;
   - pressure reducing means connected to the interior of said vacuum rings.

2. A strip record read/write processing station as in claim 1 wherein said transducer means is slidably positionable on an axis parallel to the axis of said vacuum rings.

3. A strip record read/write processing station as in claim 1 wherein said rings have a plurality of orifices extending radially therethrough and spaced uniformly around the peripheries of said rings, communicating with said pressure reducing means.

4. A strip record read/write processing station as in claim 3 wherein said station further comprises fluid impinging means partially radially surrounding said cylinder.

5. A strip record read/write processing station as in claim 3 wherein said station further comprises synchronous driving means connected to said rings, driving each of said rings at identical velocities and directions.

6. A strip record read/write processing station as in claim 3 in combination with selectively operably gating means supported adjacent to said cylinder controlling the entrance and exiting of a strip record from said station.

7. A strip record read/write processing station as in claim 6 wherein said gating means further includes a selectively operated entrance gate to cause a record strip to enter said station and a selectively operated exit gate to allow said record strip to exit said station.

8. A record strip processing station for transporting a record strip in a cylindrical path with minimal abrasive damage comprising:

a support means;

two vacuum rings rotatably mounted on said support means to grasp and transport said record strip by said strips edges, with the recording surface of said strip inwardly directed toward the axis of said cylindrical path;

transducer means supported between said rings and adjacent said cylindrical path;

fluid impinging means partially radially surrounding said cylindrical path to direct fluid flow against the other surface of said strip maintaining a cylindrical shape of said strip.

9. A record strip processing station for transporting in a cylindrical path, reading and recording a record strip with minimal abrasive damage and maximum control of recording quality and variations comprising:

a support means;

two ported vacuum drive rings rotatably mounted on said support means and spaced apart from each other attracting and forming said strip into a partial cylindrical shape with the recording surface of said strip directed inwardly toward the axis of said cylindrical shape;

transducer means moveably supported between said rings to read and record said record strip;

actuator means connected to said transducer means and support means to align said transducer means with said strip;

vacuum means connected to said vacuum drive rings providing attractive forces of said rings;

synchronous drive means connected to said vacuum rings, rotating said rings and transporting said strip;

fluid impinging means partially surrounding said cylindrical path to maintain said partial cylindrical shape of said strip.